United States Patent [19]

Oda et al.

[11] 4,019,319
[45] Apr. 26, 1977

[54] APPARATUS FOR GENERATING HIGH-PRESSURE GAS

[75] Inventors: Noriyuki Oda; Takashi Yoshida; Takeshi Nakanishi; Kensuke Yoshikawa, all of Osaka, Japan

[73] Assignee: Hitachi Shipbuilding and Engineering Co., Ltd., Osaka, Japan

[22] Filed: Aug. 14, 1975

[21] Appl. No.: 604,751

[30] Foreign Application Priority Data

Oct. 7, 1974 Japan ............................ 49-115795

[52] U.S. Cl. ........................ 60/39.46 S; 60/39.46 R; 60/258
[51] Int. Cl.[2] ........................................ F02C 3/20
[58] Field of Search ............. 60/39.46 R, 207, 215, 60/216, 217, 218, 219, 250, 39.74 A, 39.82 P, 3.82 H, 258

[56] References Cited

UNITED STATES PATENTS

| 2,689,454 | 9/1954 | Schneider | 60/39.82 P |
|---|---|---|---|
| 2,766,582 | 10/1956 | Smith | 60/39.74 R |
| 3,048,007 | 8/1962 | Zwicky | 60/218 |
| 3,056,257 | 10/1956 | Brunkhardt | 60/39.82 P |
| 3,112,608 | 12/1963 | Bridgforth | 60/216 |
| 3,357,186 | 12/1967 | Multer | 60/219 |
| 3,691,769 | 9/1972 | Keilbach | 60/217 |
| 3,771,313 | 11/1973 | Kaiho | 60/39.46 R |
| 3,802,190 | 4/1974 | Kaufmann | 60/229 |

*Primary Examiner*—Carlton R. Croyle
*Assistant Examiner*—L. J. Casaregola
*Attorney, Agent, or Firm*—Allison C. Collard

[57] ABSTRACT

High-pressure gas generating apparatus includes a gas generator body provided with a combustion chamber. The gas generator body has a primary propellant injector including orifices for injecting a primary fuel and orifices for injecting a primary oxidizing agent, both the orifices being open to the combustion chamber, an igniter for igniting the primary fuel forced out from the injector, and valve means having a secondary fuel injecting orifice for injecting a metal fuel into a high-temperature gas atmosphere to be reacted therewith and containing a secondary oxidizing agent produced by the reaction of the primary fuel injected from the primary propellant injector with the primary oxidizing agent similarly injected.

8 Claims, 2 Drawing Figures

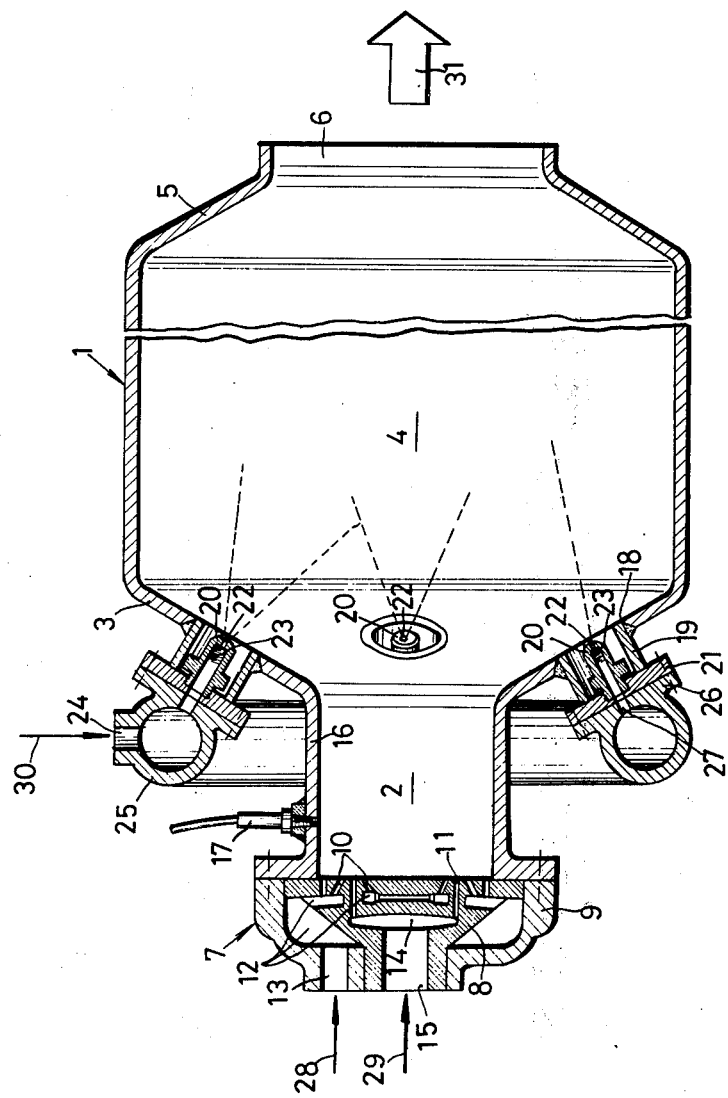

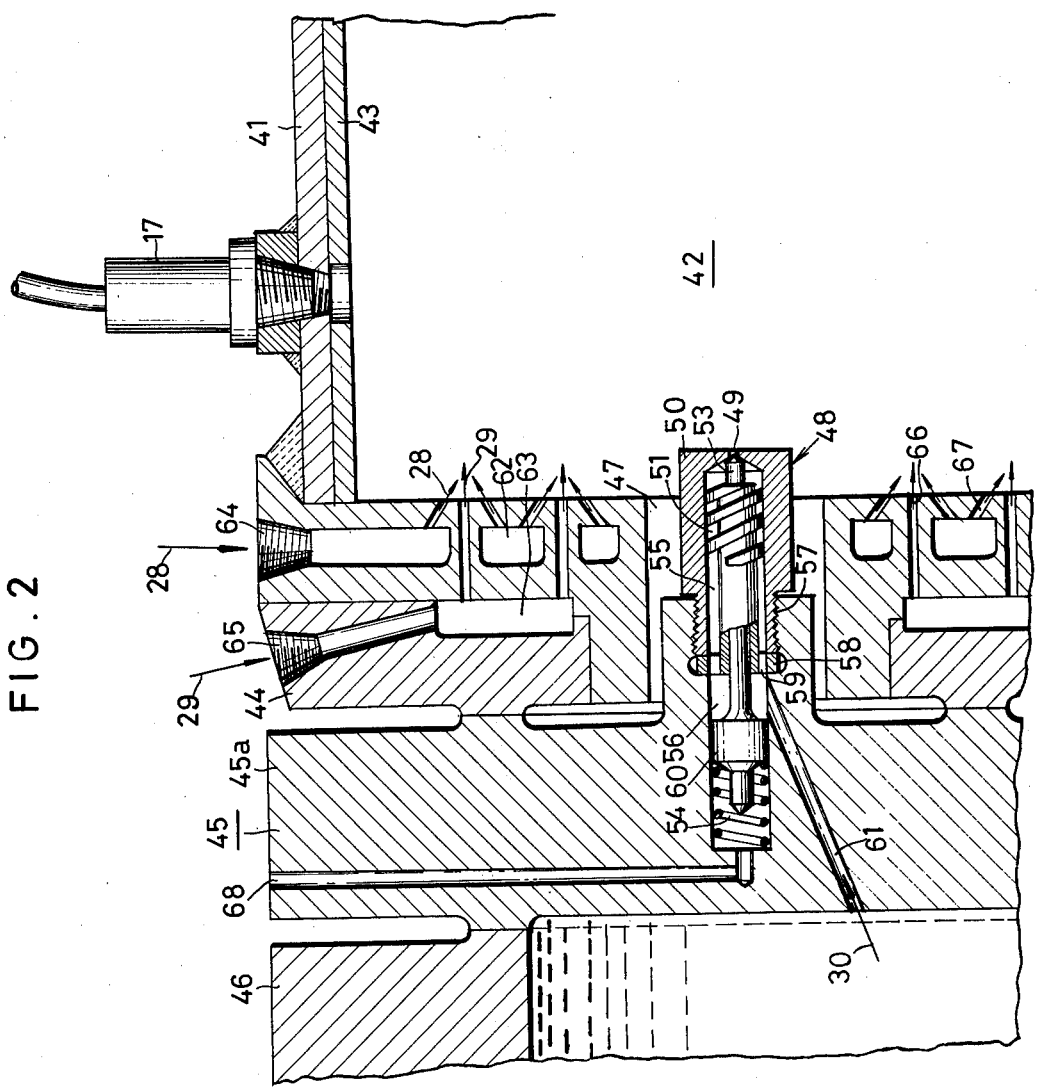

APPARATUS FOR GENERATING HIGH-PRESSURE GAS

BACKGROUND OF THE INVENTION

This invention relates to an apparatus for generating a high-pressure gas, and more particularly to an apparatus in which a three-component propellant is used to produce a high-pressure gas for use as a driving energy for turbines or the like to propel rockets or self-propelling submmarine bodies.

High pressure gas generators, especially those used in rockets or self-propelling submarine bodies, must be capable of producing a large quantity of high-pressure gas from a small amount of fuel and must have a high gas generating efficiency.

SUMMARY OF THE INVENTION

To fulfill the above requirements, this invention provides a high-pressure gas generating apparatus including a gas generator body provided with a combustion chamber, the gas generator body having a primary propellant injector including orifices for injecting a primary fuel and orifices for injecting a primary oxidizing agent, both the orifices being open to the combustion chamber, an igniter for igniting the primary fuel forced out from the injector, and valve means having a secondary fuel injecting orifice for injecting a metal fuel into a high-temperature gas atmosphere to be reacted therewith said containing a secondary oxidizing agent produced by the reaction of the primary fuel injected from the primary propellant injector with the primary oxidizing agent similarly injected.

With reference to the accompanying drawings, this invention will be described below in greater detail.

BRIEF DESCRIPTION OF THE DRAWINGS

FIG. 1 is a view in vertical section showing a high-pressure gas generating apparatus according to this invention; and FIG. 2 is a fragmentary view in vertical section showing another embodiment of the apparatus of this invention.

DESCRIPTION OF THE PREFERRED EMBODIMENTS

Throughout the specification and claims, the right-hand side of the drawing will be referred to as "front" and the left-hand side of the same as "rear."

With reference to FIG. 1, a gas generator body 1 is cylindrical and includes a minor rear end portion having a reduced diameter and serving as a precombustion chamber 2. The rear end portion is integral with a rear tapered portion 3 which is continuous with a major portion defining a main combustion chamber 4 having a large diameter. The major portion is continuous with a front tapered portion 5 which is formed with a combustion gas outlet 6 having a reduced diameter. The rear open end of the precombustion chamber 2 is provided and closed with a primary propellant injector 7 comprising an injector main body 8 and a cover 9 covering the main body 8 from outside. The injector main body 8 is formed in its front portion with a plurality of primary fuel orifices 10 and a large number of primary oxidizing agent orifices 11 in corresponding relation thereto. Both the orifices 10 and 11 are so directed and arranged that the primary fuel and primary oxidizing agent will be thoroughly mixed together within the precombustion chamber 2. Formed in the rear end of the cover 9 is a primary fuel inlet 13 communicating with orifices 10 by way of passages 12. The rear portion of the injector main body 8 is exposed from the rear surface of the cover 9. An inlet 15 for the primary oxidizing agent is formed in the exposed rear portion and is in communication with the orifices 11 through a passage 14. An igniter 17 mounted in the peripheral wall 16 of the precombustion chamber 2 is exposed to the interior of the chamber 2. At a predetermined spacing a plurality of bores 18 are formed in the rear tapered portion 3, and an outwardly projecting short tube 19 is welded to the inner periphery of each of the bored portions 18. Welded to the outer end of the short tube 19 is a disk 21 having valve means 20. In construction, the valve means 20 is similar to the valve means shown in greater detail in FIG. 2 illustrating another embodiment of the apparatus of this invention. The valve means 20 has a metal fuel or secondary fuel orifice 22 directed toward the center of the main combustion chamber 4 and includes a swirler 23 for swirling the secondary fuel. To lessen the influence of combustion heat, the orifice 22 is positioned, without being projected into the combustion chamber 4, in the same plane as the inner surface of the rear tapered portion 3 or the inner surface of the main combustion chamber 4. The orifice 22 may be positioned further outward from the plane. An annular secondary fuel supply tube 25 having a fuel inlet 24 extends around the precombustion chamber 2 and has mounting disk portions 26 by means of which the tube 25 is secured with bolts and nuts to the disks 21 carrying the valve means. The disk portion 26 and disk 21 are formed with a hole 27 communicating with a valve chamber.

To initiate the high-pressure gas generating apparatus into operation, a primary fuel 28 and a primary oxidizing agent 29 are simultaneously forced into the apparatus through the inlets 13 and 15 and are injected into the precombustion chamber 2 through the orifices 10 and 11 respectively, thereby being thoroughly mixed together, whereon the mixture is ignited by the igniter 17. Liquid hydrogen or the like is used as the primary fuel, and liquid oxygen or fluorine or the like is used as the primary oxidizing agent. Upon ignition, the primary fuel and oxidizing agent react with each other, producing in the precombustion chamber 2 a high-temperature combustion gas containing a secondary oxidizing agent such as high-temperature water vapor, etc. The hot gas is continuously supplied to the main combustion chamber 4. Subsequently, the metal fuel or secondary fuel 30 is forced into the inlet 24 and injected into the main combustion chamber 4 through orifices 22 of the valve means 20. Usable as the secondary fuel is one suitably selected from the group consisting of lithium, aluminum, magnesium, the secondary boron and like light metal, mixtures thereof and compounds thereof. The secondary fuel is used in the form of powder or in molten state. The injected metal fuel or secondary fuel comes into contact with thesecondary oxidizing agent such as high-temperature water vapor contained in the hot precombustion gas atmosphere in the main combustion chamber 4 and undergoes vigorous reaction upon spontaneous ignition, giving off a large quantity of high-temperature and high-pressure combustion gas 31. The gas 31 is forced out from the outlet 6 for use as an energy to drive for example a turbine or the like.

The operation is discontinued by stopping the supply of primary fuel 28 and primary oxidizing agent 29 to the inlets 13 and 15 as well as the supply of secondary fuel 30 to the inlet 24. When the pressure of the secondary fuel 30 is removed, the valve automatically closes the orifice 22, whereby the secondary fuel retained in the valve means 20 for injection is prevented from degradation which would otherwise occur by contact with the substance in the main combustion chamber 4. This prevents clogging of the orifices 22 and assures smooth injection of the secondary fuel when the apparatus is brought into operation again.

FIG. 2 shows another embodiment of the high-pressure gas generating apparatus according to this invention.

Although not shown in detail, a gas generator body 41 is cylindrical and has an internal combustion chamber 42 and an open front end serving as a combustion gas outlet. The combustion chamber 42 is lined with ceramics or like heat-resistant material as at 43. Positioned at the rear end of the combustion chamber 42 are a primary propellant injector 44 and a secondary fuel injector 45, each in the form of a disk, with the former positioned in front of the latter. These injectors close the rear end of the chamber 42. A hollow cylindrical secondary fuel storage chamber 46 is positioned to the rear of the chamber 42, with the injectors 44 and 45 interposed therebetween. The fuel storage chamber 46 is provided with unillustrated pressing means for forcing out the fuel and, when desired, with heating means for melting the fuel. The injectors 44 and 45 are so connected as to be diametrically displaceable relative to each other due to thermal expansion or contraction to thereby prevent one of the injectors 44 and 45 from exercising a serious influence on the other by virtue of the difference between the two in the degree of thermal expansion.

In the center of the secondary injector 45, there is provided valve means 48 extending through a bore 47 in the center of the primary propellant injector 44 and exposed to the interior of the combustion chamber 42. The valve means 48 comprises an injector housing 50 U-shaped in vertical section and having a secondary fuel injecting orifice 49 in its front end, a swirler 52 intimately fitted in the housing 50 to form a fuel swirling passageway 51, a needle valve 53 slidably inserted in a center bore in the swirler 52 and adapted to open or close the orifice 49 and a spring 54 always biasing the needle valve 53 in the direction to close the orifice 49. The injector housing 50 is screwed at its rear end into the internally threaded front end 57 of a blind bored portion 56 formed in the plate 45a of the secondary fuel injector 45 and opened to the combustion chamber 42. The injector housing 50 projects into the combustion chamber 42. The swirler 52 has at its rear end a flange 58 which is pressed by the rear end of the injector housing 50 against the stepped part of the bored portion 56, whereby the swirler is held in position. The flange 58 has a plurality of ports 59. Mounted on the rear end of the needle valve 53 is a piston 60 slidable along the inner surface of the bored portion 56. The spring 54 bears at its opposite ends against the rear surface of the piston 56 and the bottom wall of the bored portion 56. An air vent 68 in communication with the outer atmosphere extends from the rear end of the bored portion 56. The plate 45a has a secondary fuel passage 61 having one end opened to the fuel storage chamber 46 and the other end opened to the interior of the bored portion 56 at a position to the front of the piston 60.

The primary propellant injector 44 is formed with an annular primary fuel passage 62 and an annular primary oxidizing agent passage 63 into which the primary fuel 28 and primary oxidizing agent 29 are introduced through inlets 64 and 65 respectively. The injector 44 has a large number of primary oxidizing agent orifices 66 communicating with the primary oxidizing agent passage 63 and arranged at a predetermined spacing on two circumferential lines centered about the secondary fuel orifice 49. The primary oxidizing agent orifices 66, although arranged on two circumferential lines in the illustrated embodiment, may be arranged only on a single circumferential line or on at least three circumferential lines. Primary fuel orifices 67 communicating with the primary fuel passage 62 are arranged around each of the primary oxidizing agent orifices 66 as directed toward the extension of center line of the orifice 66.

Throughout FIGS. 1 and 2 like parts are referred to by like reference numerals.

With this embodiment, the primary fuel 28 and the primary oxidizing agent 29, simultaneously forced in through the inlets 64 and 65, are injected into the combustion chamber 42 through the orifices 67 and 66 and are thoroughly mixed together by virtue of impingement on each other. The mixture is ignited by the ignitor 17, whereupon the primary fuel reacts with the oxidizing agent, producing in the combustion chamber 42 a high-temperature gas containing a secondary oxidizing agent. Subsequently, the fuel in the fuel storage chamber 46 is pressed from the rear to force the secondary fuel 30 into the fuel passage 61. Although the needle valve 53 in the valve means 48 holds the orifice 49 closed to prevent inflow of the combustion gas into the fuel storage chamber 46 and to thereby protect the metal fuel from degradation, especially from oxidation, the fuel forced into the bored portion 56 exerts a pressure on the piston 60, retracting the needle valve 53 against the action of the spring 54 to open the orifice 49. Consequently, the secondary fuel passes through the passageway 51 in the form of a swirling stream and is forced out from the orifice 49 in the form of a conical jet of fine particles. The primary fuel therefore comes into contact with the secondary oxidizing agent already produced within the combustion chamber 42, undergoing vigorous reaction upon spontaneous ignition to produce a large quantity of high-temperature high-pressure combustion gas.

To halt the operation, the supply of primary fuel 28 and primary oxidizing agent 29 into the inlets 64 and 65 is discontinued, and the pressure on the fuel in the fuel storage chamber 46 is removed, whereupon the needle valve 53 is returned by the force of spring 54 to close the orifice 49. The spring action may be replaced by the pressure of inert gas such as helium, argon or the like to hold the orifice 49 closed by the valve 53. In this case, the inert gas may be charged in through the vent 68.

What is claimed is:

1. An apparatus for generating a high temperature and high-pressure combustion gas from a three component propellant for use as a driving energy for turbines, comprising:
a primary oxidizing agent, a primary fuel and a secondary fuel, and in which a secondary oxidizing agent for the secondary fuel is formed by the interaction of said primary fuel with said primary oxidizing agent and said secondary fuel is a metal fuel, said apparatus including a gas generator body provided with a combustion chamber, said combustion chamber including a chamber portion, said gas generator body including a primary propellant injector having orifices for injecting the primary fuel into said chamber portion, and orifices for injecting the primary oxidizing agent into said chamber portion, for assuring that both said primary fuel and said primary oxidizing agent are thoroughly mixed together, both said orifices being open to the chamber portion of said combustion chamber, an igniter in communication with said chamber portion, for igniting the primary fuel forced out from said injector and thereby igniting the mixture of said primary fuel with said primary oxidizing agent which react with each other to produce in said chamber portion a high temperature combustion gas containing said secondary oxidizing agent, said secondary oxidizing agent being formed exclusively from products of the combustion of said primary fuel with said primary oxidizing agent, and valve means having a secondary fuel injecting orifice communicating with said combustion chamber for injecting a metal fuel into said combustion chamber, said metal fuel combining with said high temperature gas containing said secondary oxidizing agent formed in said chamber portion for reaction with said secondary oxidizing agent for producing the high-temperature and high-pressure combustion gas, said gas generator body including an outlet for the combustion gas.

2. An apparatus as deinfed in claim 1 wherein the combustion chamber comprises said chamber portion which includes a precombustion chamber and a main combustion having a larger volume than the precombustion chamber and communicating therewith, and the primary propellant injector is exposed to the interior of the precombustion chamber, the valve means being exposed to the interior of the main combustion chamber.

3. An apparatus as defined in claim 1 wherein the gas generator body has a tapered portion provided with a plurality of the valve means arranged at a predetermined spacing, the secondary fuel injecting orifices of the valve means being directed toward the center of the combustion chamber.

4. An apparatus as defined in claim 1 wherein the valve means comprises an injector housing having a secondary fuel injecting orifice in its front end, a swirler intimately fitted in the injector housing to form a fuel swirling passageway, a needle valve slidably fitted in a center bore in the swirler to open or close the orifice, and pressing means always pressing the needle valve in the direction to close the orifice, the needle valve being movable toward its open position by the secondary fuel forced into the valve means.

5. An apparatus as defined in claim 4 wherein the pressing means is a spring.

6. An apparatus as defined in claim 4 wherein the pressing means is an inert gas.

7. An apparatus for generating a high-pressure gas for use as a driving energy from a three component propellant, comprising a primary oxidizing agent, a primary fuel and a metal fuel, said apparatus comprising a gas generator body, comprising a combustion chamber, a secondary fuel storage chamber, a combustion gas outlet, and a primary propellant injector including orifices for injecting the primary fuel and orifices for injecting the primary oxidizing agent, both said orifices being open into said combustion chamber, said chamber including a chamber portion having direct communication with said orifices for receiving the primary fuel and the primary oxidizing agent, an igniter for igniting the primary fuel forced out from said injector to cause the primary fuel to reach with said primary oxidizing agent, said chamber portion and said igniter cooperating to assure that the primary fuel and the primary oxidizing agent are thoroughly mixed together to form a high-temperature gas atmosphere containing a secondary oxidizing agent formed exclusively from the reaction of the primary fuel with the primary oxidizing agent, and a secondary fuel injector including valve means having a secondary fuel injecting orifice for injecting said metal fuel into the high temperature gas atmosphere, containing said secondary oxidizing agent for reaction with said metal fuel to produce the high-pressure gas, which exits through said outlet, said valve means being in communication with said secondary fuel storage chamber.

8. An apparatus as defined in claim 7 wherein the secondary fuel injector is provided in its center with the valve means exposed to the combustion chamber and extending through a bore in the center of the primary propellant injector, the valve means comprising an injector housing having a secondary fuel injecting orifice in its front end, a swirler intimately fitted in the injector housing to form a fuel swirling passageway, a needle valve having a piston thereon and slidably fitted in a center bore in the swirler to open or close the orifice, and a spring always biasing the needle valve in the direction to close the orifice, the injector housing being fitted in the front end of a blind bored portion formed in the center of a plate of the secondary fuel injector and having an end open to the combustion chamber, the bored portion communicating with the storage chamber through a passage, the piston being positioned to the rear of the passage, the spring bearing at its opposite ends against the rear surface of the piston and the bottom wall of the bored portion.

* * * * *